(12) United States Patent
San Andres

(10) Patent No.: US 8,744,830 B2
(45) Date of Patent: Jun. 3, 2014

(54) SYSTEMS AND METHODS FOR ELECTRICAL FAULT RESTORATION

(75) Inventor: Ramon Juan San Andres, Atlanta, GA (US)

(73) Assignee: General Electric Company, Schenectady, NY (US)

(*) Notice: Subject to any disclaimer, the term of this patent is extended or adjusted under 35 U.S.C. 154(b) by 183 days.

(21) Appl. No.: 13/222,791

(22) Filed: Aug. 31, 2011

(65) Prior Publication Data
US 2013/0054216 A1 Feb. 28, 2013

(51) Int. Cl.
*G06F 17/50* (2006.01)

(52) U.S. Cl.
USPC ............ 703/13; 703/2; 703/6; 703/7; 703/14

(58) Field of Classification Search
USPC ............................................ 706/13; 700/297
See application file for complete search history.

(56) References Cited

U.S. PATENT DOCUMENTS

| | | | |
|---|---|---|---|
| 6,223,316 | B1 | 4/2001 | Bommu et al. |
| 6,816,757 | B1 * | 11/2004 | De La Ree et al. ........... 700/286 |
| 7,756,694 | B2 * | 7/2010 | Graf et al. ..................... 703/10 |
| 2007/0005193 | A1 * | 1/2007 | Nelson et al. ................ 700/286 |
| 2010/0161151 | A1 * | 6/2010 | Yang et al. ................... 700/297 |
| 2012/0203479 | A1 * | 8/2012 | Yadav et al. .................. 702/58 |
| 2012/0239601 | A1 * | 9/2012 | Wang et al. .................. 706/13 |

OTHER PUBLICATIONS

Lin et al. ("Fault Detection, Isolation and Restoration using a Multi-agent-based Distribution Automation System", IEEE, 2009, pp. 2528-2533).*
Mekic et al. ("Fault Detection Isolation and Restoration on the Feeder (FDIR): Pick Your Technology", 21st International Conference on Electricity Distribution, Frankfurt, Jun. 6-9, 2011. pp. 1-8).*
Men-Shen Tsai ("Development of an Object-Oriented Service Restoration Expert System With Load Variations", IEEE, Feb. 2008,pp. 219-225).*
Wang et al. ("OBDD-Based Sectionalizing Strategies for Parallel Power System Restoration ", IEEE, Aug. 2011,pp. 1426-1433).*
Apel et. all. ("Summary: Fault Management in Electrical Distribution Networks", ABB Utility Automation GmbH, Germany).*

* cited by examiner

*Primary Examiner* — Omar Fernandez Rivas
*Assistant Examiner* — Iftekhar Khan
(74) *Attorney, Agent, or Firm* — Sutherland Asbill & Brennan LLP

(57) ABSTRACT

Certain embodiments of the invention may include systems and methods for providing electrical fault restoration. According to an example embodiment of the invention, a method can include sectioning a de-energized region into two or more de-energized areas; simulating opening or closing of one or more circuit switches associated with the two or more de-energized areas; compiling a listing of simulated energized areas and simulated de-energized areas, based on the simulated opening or closing of the one or more circuit switches; evaluating the listing of simulated energized areas and simulated de-energized areas, based at least in part on one or more configurable strategy modules; and generating a restoration plan based at least in part on the evaluation.

18 Claims, 4 Drawing Sheets

SYSTEMS AND METHODS FOR ELECTRICAL FAULT RESTORATION

FIELD OF THE INVENTION

This invention generally relates to electrical transmission systems, and in particular, to electrical fault restoration.

BACKGROUND OF THE INVENTION

When a fault occurs in an electrical transmission system, switches, circuit breakers, etc., may be utilized to isolate the faulted area. Isolating the fault may allow power to remain on in certain areas, but other areas of the network may remain without power. Restoration of the de-energized areas should be done quickly in order to minimize lost revenue and customer outage time. Power companies may prioritize restoration options based on different criteria, such as load restored, number of customers restored, number of switch operations performed, etc.

Certain restoration algorithms can be used to accomplish power restoration. For example, a fault detection, isolation and restoration (FDIR) algorithm may be utilized with a restoration engine to determine a solution based on the single FDIR algorithm. Such restoration is often viewed and treated as a single operation on a circuit, which may not allow for refinement and optimization of restoration implementations.

BRIEF SUMMARY OF THE INVENTION

Some or all of the above needs may be addressed by certain embodiments of the invention. Certain embodiments of the invention may include systems and methods for electrical fault restoration.

According to an example embodiment of the invention, a method is provided. The method can include sectioning a de-energized region into two or more de-energized areas; simulating opening or closing of one or more circuit switches associated with the two or more de-energized areas; compiling a listing of simulated energized areas and simulated de-energized areas, based on the simulated opening or closing of the one or more circuit switches; evaluating the listing of simulated energized areas and simulated de-energized areas, based at least in part on one or more configurable strategy modules; and generating a restoration plan based at least in part on the evaluation.

According to another example embodiment, a system is provided. The system can include at least one memory for storing data and computer-executable instructions; and at least one processor configured to access the at least one memory and further configured to execute the computer-executable instructions. The computer-executable instructions can be operable to section a de-energized region into two or more de-energized areas; simulate opening or closing of one or more circuit switches associated with the two or more de-energized areas; compile a listing of simulated energized areas and simulated de-energized areas, based on the simulated opening or closing of the one or more circuit switches; evaluate the listing of simulated energized areas and simulated de-energized areas, based at least in part on one or more configurable strategy modules; and generate an electrical network restoration plan based at least in part on the evaluation.

Other embodiments and aspects of the invention are described in detail herein and are considered a part of the claimed inventions. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
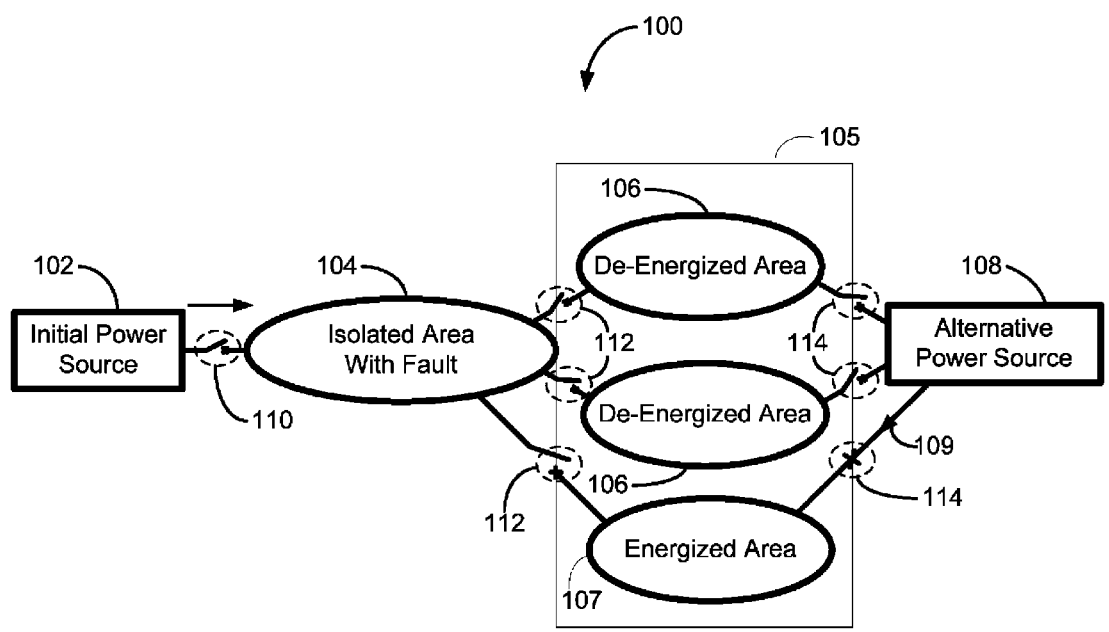
FIG. 1 is a block diagram of an illustrative electrical distribution system with a fault, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention provide a restoration engine framework for use with fault detection, isolation and restoration (FDIR) algorithms. Example embodiments can allow separating the restoration algorithms from the restoration engine. In an example embodiment, a generic restoration engine may be used, and the actual restoration implementations may be "plugged into" or used in conjunction with the engine at initialization time. Example embodiments of the invention can allow treating restoration as a process achieved via the sequential application of transformations.

Example embodiments of the invention can provide a framework for deciding how to section or split a power network. For example, if the energized area is large, it may be split in hundreds or thousands of different ways. Example embodiments of the invention may allow splitting scenarios to be weighed, for example, with respect to who gets power and who is left without power. Such weighting may take many different criteria into consideration. For example, in certain scenarios, several regions may be de-energized due to a fault, but different prioritizations for repair or restoration may leave certain customers without power longer than other customers. The questions that arise include "how is the prioritization decided?" and "is priority given to important clients and hospitals?" According to example embodiments of the invention, different restoration criteria can produce different results, and many different algorithms may be applied to the restoration plan.

Example embodiments of the invention may utilize one or more transformation modules that may be designed for specific treatments of the network. For example, part of the transformation can be directed towards splitting the energized area into different de-energized areas. Another transformation could be feeding energy into an area so it moves from the de-energized list to the restored list based on a given priority. According to an example embodiment, transformation modules may be executed in a predetermined order. According to example embodiments, different transformation modules may ease testing and troubleshooting. In an example embodiment, certain transformation algorithms may split the network into many different restored areas, and by applying an optimization module, the multiple restored areas may be combined into a single area.

According to certain example embodiments of the invention, when a fault is detected, information may be requested about the network. For example, "what switches near the fault are open or closed, what switches are automatic, or what switches are manual?" According to an example embodiment, algorithms may be executed using the received information to generate switching plans.

According to an example embodiment, based on the circuit state information provided to the restoration engine and on the FDIR configuration, the restoration engine may build a list of de-energized areas and a list of energized areas. The list of de-energized areas may be initialized with the de-energized areas downstream from each downstream isolation switch (for example, a downstream switch that bounds the area that isolates an electric fault). The list of restored areas may be initially empty. According to an example embodiment, a de-energized area may be represented by an object with an isolation switch, one or more tie switches (for example, open switches that can be used to connect to alternate power sources), and metric information. In an example embodiment, a restored area may be represented by an object with one or more tie switches, a list of switch actions (switch open/close operations) and metric information.

According to an example embodiment of the invention, at every point before and after execution of a transformation, the sum of the areas in the de-energized list and the restored list cover the same circuit area. In other words, through every transformation, every element of the circuit in the areas described by the de-energized list initialized by the restoration engine exists within a de-energized area or a restored area. In an example embodiment, transformation modules maintain this rule.

According to an example embodiment, once the de-energized area list and the restored area list have been created, control may be given to the restoration framework, which may invoke each transformation module in sequence. The list of transformation modules and the sequence in which they are applied may be configured at the time that the restoration engine is loaded and initialized. According to example embodiments, each transformation module may include a single entry point, for example:

transform(deEnergizedList, restoredList, optimizationMetric)

In an example embodiment, the transform method of the transformation module takes the de-energized area list, the restored area list, and the restoration optimization metric criterion and performs the particular transformation for which the module was designed. In example embodiments, a goal of the sequential execution of the transformation modules is to minimize the list of de-energized areas given the restoration optimization metric criterion. Because of the coverage rule described above, a minimized de-energized area implies a maximized recovered area.

According to an example embodiment, a transformation module may extract a de-energized area object from the de-energized area list and may apply some restoration algorithms to the object, which may result in zero or more restored area objects and zero or more de-energized area objects. According to an example embodiment, the module may add the restored objects to the restored area list and the de-energized objects to the de-energized area list. As described above, each restored-area object contains the switch operations that resulted in the restoration of power within the given area. In an example embodiment, a transformation module may also perform other transformations, such as the coalescing of contiguous restored areas, optimization of restoration steps etc.

According to example embodiments, various systems, modules, etc., for providing a transformation-based electrical fault restoration framework will now be described with reference to the accompanying figures.

FIG. 1 shows a block diagram of an illustrative electrical distribution system 100 according to an example embodiment of the invention. The distribution system 100 shown may include an initial power source 102, a faulted area 104, a de-energized region 105 that can include one or more de-energized areas 106, and an alternative power source 108. According to an example embodiment, and as shown for illustrative purposes, one of the original de-energized areas may be brought back on-line and may become an energized area 107 by connecting power from the alternative power source 108 through one or more closed tie switches 114, which may allow power 119 to flow from the alternative power source 108 to the energized area 107. In an example embodiment, the de-energized areas 106 and the energized area 107 may remain isolated from the faulted area 104 by one or more opened isolation switches 112. According to an example embodiment, de-energized areas 106 may be connected to the alternative power source 108 by one or more tie switches 114.

Figure 2:
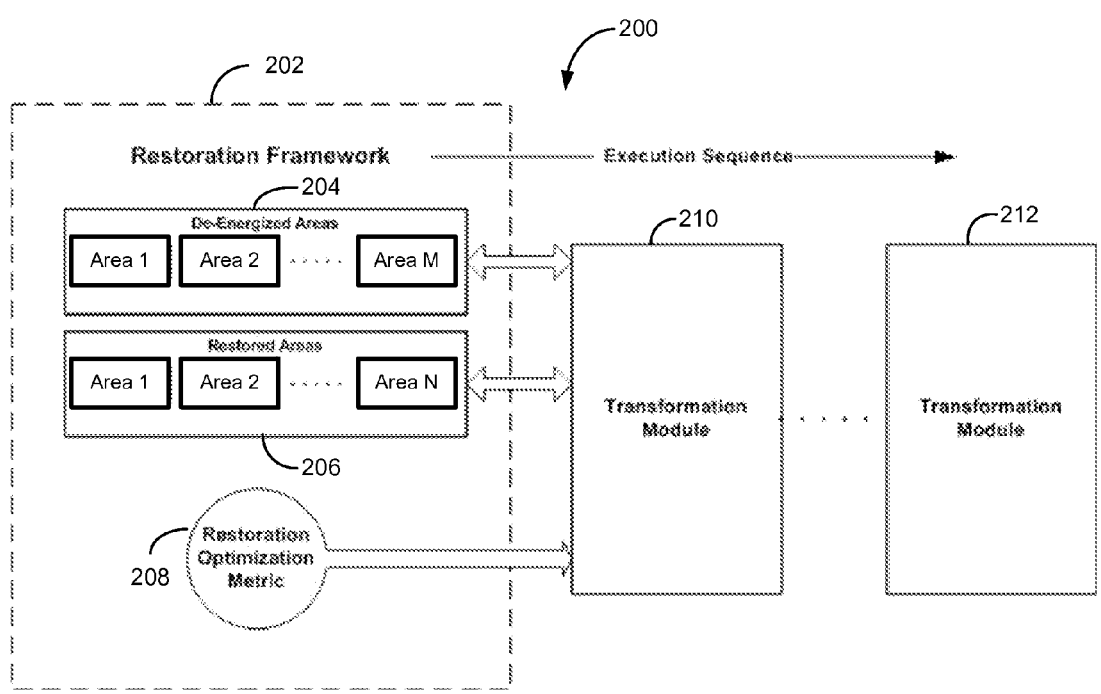
FIG. 2 is a block diagram of an illustrative restoration process, according to an example embodiment of the invention.

FIG. 2 depicts a restoration block diagram 200, according to an example embodiment of the invention. For example, a restoration framework 202 may be utilized for tabulating de-energized areas 204 and restored areas 206. In an example embodiment, the restoration framework 202 may work in conjunction with transformation modules 210, 212 to generate diverse restoration plans for areas of an electric circuit that have been de-energized because of an electric fault. According to an example embodiment, a restoration optimization metric 208 may be utilized in conjunction with the restoration framework 202 and the transformation modules 210, 212 to evaluate the efficacy and efficiency of the generated restoration plan.

Rather than implementing a specific restoration algorithm, example embodiments of the invention include a generic framework that may implement an iterative transformation-based approach to power restoration. According to an example embodiment, the framework 202 may identify and maintain lists of de-energized areas 204 and restored areas 206. In an example embodiment, the restoration optimization metric 208 may provide the criterion upon which the restoration is to be optimized. In an example embodiment, the transformation modules 210, 212 may include configurable, pluggable strategies that perform transformations in the circuit by operating on the lists of de-energized areas 204 and restored areas 206, guided by the restoration optimization metric 208.

According to an example embodiment, the transformation modules 210, 212 may perform transformations on the circuit lists 204, 206 by simulating the opening or closing of the circuit switches. The two circuit lists 204, 206 may include the representation of the circuit areas that will remain with or without electric energy because of the cumulative effect of the simulated switch operations. According to example embodiments, after the sequential execution of all the configured transformation modules 210, 212, the list of restored areas 206 contains those circuits on which power can be successfully restored, and the list of de-energized areas 204 contains those circuits that will remain de-energized.

In an example embodiment, the framework 202 provides a facility for the generation of a restoration plan (i.e. a plan including switch open or close actions) that will bring the physical circuit to the restoration state represented by the de-energized area 204 and restored area 206 lists.

Figure 3:
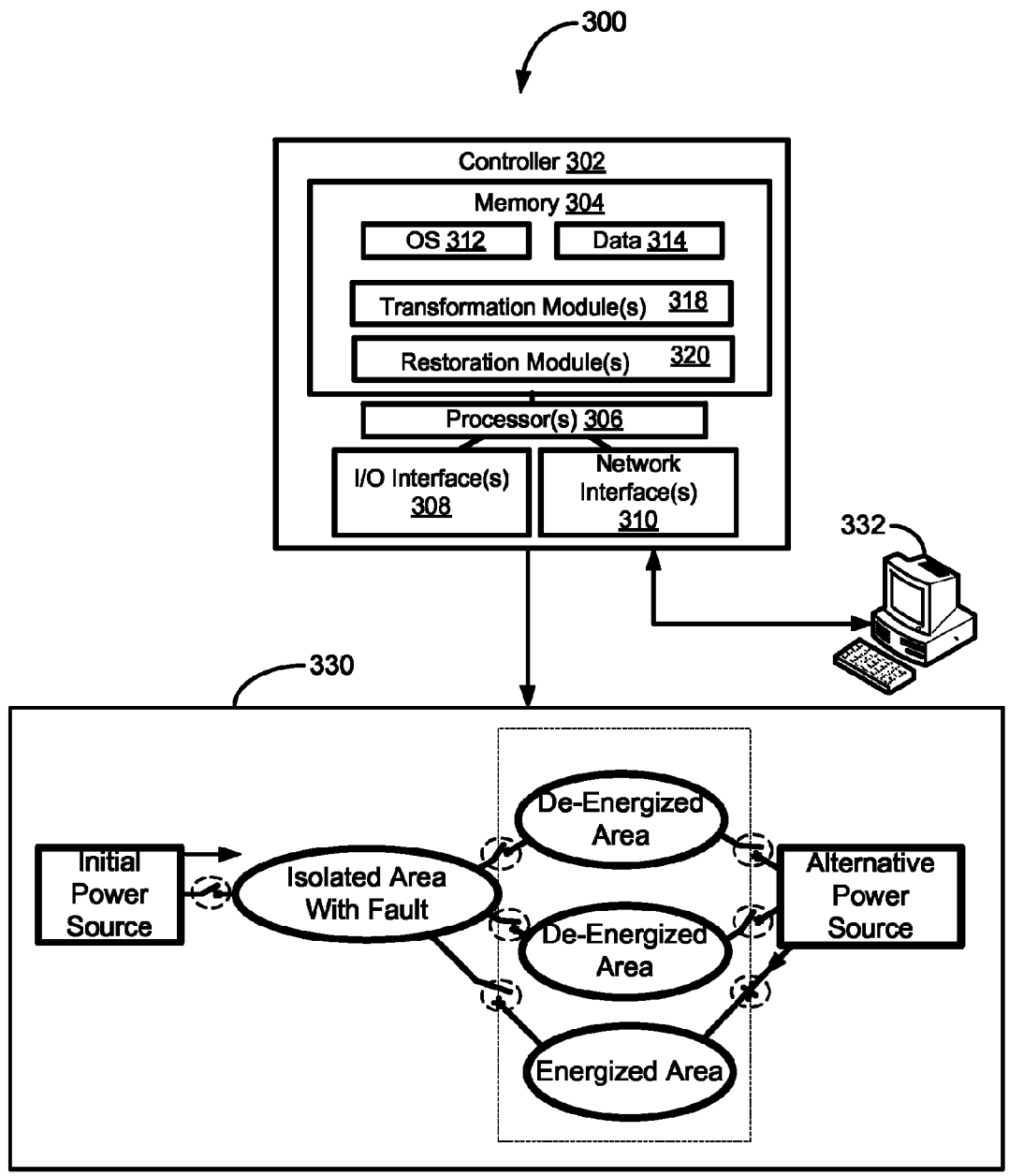
FIG. 3 is a block diagram of an illustrative restoration system, according to an example embodiment of the invention.

FIG. 3 depicts a restoration system 300 according to an example embodiment of the invention. The system 300 may work in conjunction with an actual or modeled version of the electrical distribution system 330. In an example embodiment, the system includes a controller 302, which includes a memory 304 and one or more processors 306 in communication with the memory 304. The memory 304 can include an operating system 312 and data 314. The memory can include one or more transformation modules 318 (such as 210, 212 of FIG. 2). The memory may also include a restoration optimization module 320 (which may correspond to restoration optimization metric 208 of FIG. 2). Example embodiments of the controller 302 may include one or more input/output interfaces308, and/or one or more network interfaces 310. In an example embodiment, the system 300 may include a local or networked workstation 332. In other examples, the system 300 may include a communications network and an external database (not shown) in communication with the system 300 and/or the communications network.

Figure 4:
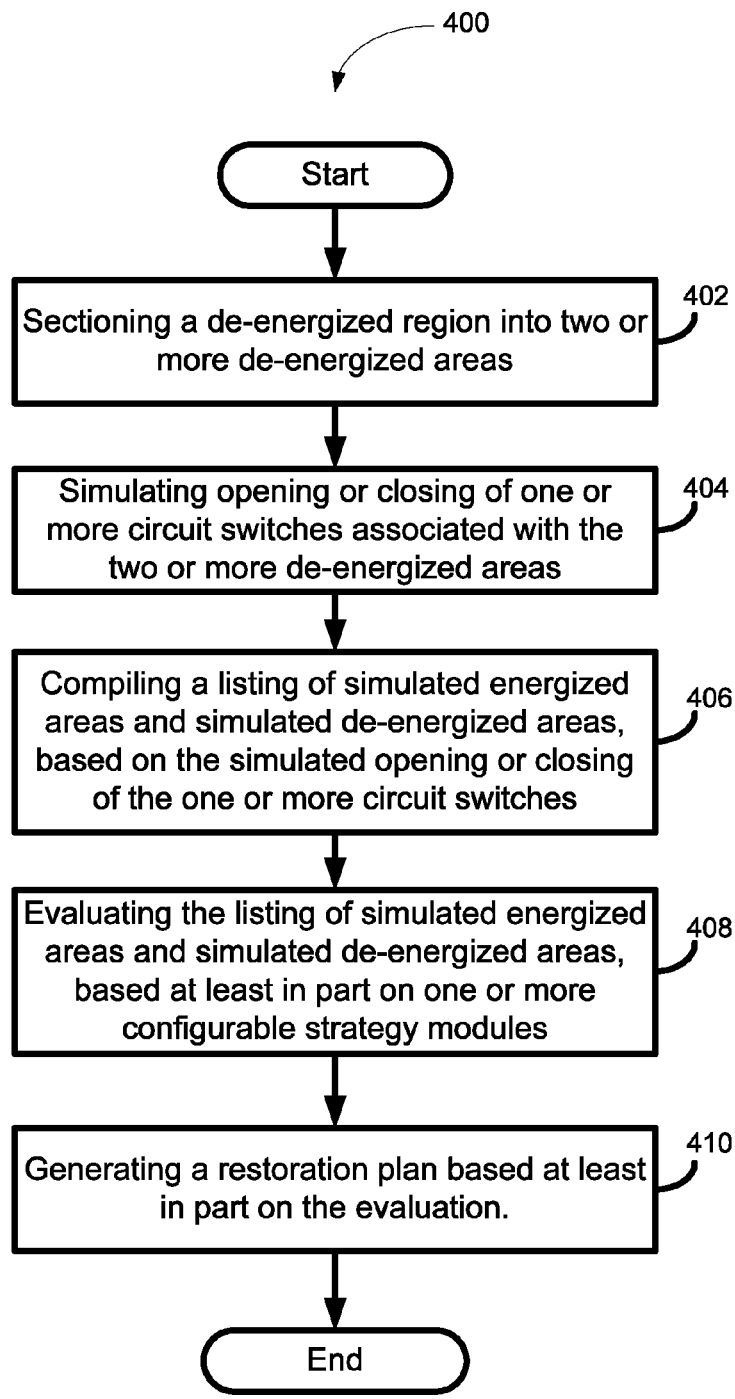
FIG. 4 is a flow diagram of an example method according to an example embodiment of the invention.

An example method 400 will now be described with reference to the flowchart of FIG. 4. The method 400 starts in block 402 and includes sectioning a de-energized region into two or more de-energized areas. In block 404, method 400 includes simulating opening or closing of one or more circuit switches associated with the two or more de-energized areas. In block 406, method 400 includes compiling a listing of simulated energized areas and simulated de-energized areas, based on the simulated opening or closing of the one or more circuit switches. In block 408, method 400 includes evaluating the listing of simulated energized areas and simulated de-energized areas, based at least in part on one or more configurable strategy modules. In block 410, method 400 includes generating a restoration plan based at least in part on the evaluation. Method 400 ends after block 410.

Example embodiments of the invention include determining a switching state associated with one or more switches 112, 114. Example embodiments further include prioritizing restoration of de-energized areas 106 based at least in part on one or more metrics 208, wherein the metrics 208 include one or more of revenue, customer profiles, length of outage, available power source ratings, and switch ratings. Example embodiments of the invention include evaluating the listing of simulated energized areas 107, which may include a sequential transformation of the listing by the one or more configurable strategy modules 210, 212. According to example embodiments, the transformation includes an operation having an input including a listing of simulated energized areas 107, a listing of simulated de-energized areas 106, and an optimization metric 208. In an example embodiment, two or more de-energized areas 106 include at least one isolation switch 112 and zero or more tie switches 114. In an example embodiment, the zero or more tie switches 114 are operable for connecting to an alternative power source 108. According to an example embodiment, the simulated energized areas 107 include at least one tie switch 114. Example embodiments of the invention include minimizing the simulated de-energized areas 106 based at least in part on the one or more metrics 208. According to example embodiments, generating the restoration plan includes zero or more energized areas 107 each having one or more tie switches 114, and zero or more de-energized areas 106 each one having zero or more tie switches 114.

Example embodiments of the invention include a system having at least one memory for storing data and computer-executable instructions; and at least one processor configured to access the at least one memory and further configured to execute the computer-executable instructions to: section a de-energized region 105 into two or more de-energized areas 106; simulate opening or closing of one or more circuit switches 112, 114 associated with the two or more de-energized areas 106; compile a listing of simulated energized areas 107 and simulated de-energized areas 106, based on the simulated opening or closing of the one or more circuit switches 112, 114; evaluate the listing of simulated energized areas 107 and simulated de-energized areas 106, based at least in part on one or more configurable strategy modules 210, 212; prioritize restoration of de-energized areas 106 based at least in part on one or more metrics 208; and generate an electrical network restoration plan based at least in part on the prioritization. According to an example embodiment, the at least one processor is further configured to determine a switching state associated with one or more switches 112, 114. According to an example embodiment, the at least one processor is further configured to prioritize restoration based on one or more of revenue, customer profiles, length of outage, available power source ratings, and switch ratings.

According to an example embodiment, the at least one processor is further configured to evaluate the listing of simulated energized areas 107 based at least in part on a sequential transformation of the listing by the one or more configurable strategy modules 210, 212. According to an example embodiment, the transformation comprises an operation having an input comprising a listing of simulated energized areas 107, a listing of simulated de-energized areas 106, and an optimization metric 208. According to an example embodiment, the two or more de-energized areas 106 include at least one isolation switch 112 and zero or more tie switches 114. According to an example embodiment, the zero or more tie switches 114 are operable for connecting to an alternative power source 108. According to an example embodiment, the simulated energized areas 107 comprise at least one tie switch 114. According to an example embodiment, the at least one processor is further configured to minimize the simulated de-energized areas 106 based at least in part on the one or more metrics 208. According to an example embodiment, the electrical network restoration plan comprises zero or more energized areas 107 each having one or more tie switches 114, and zero or more de-energized areas 106 each one having zero or more tie switches 114.

According to example embodiments, certain technical effects can be provided, such as creating certain systems and methods that reduce the size of the de-energized area 106 by restoring as much load as possible within "trunks" from all available tie switches 114. Example embodiments of the invention can provide the further technical effects of providing systems and methods that can apply a relatively complex optimization algorithm within the reduced de-energized area 106 to recover as much power as possible given an optimization metric.

In example embodiments of the invention, the electrical distribution system 100 and the restoration system 300 may include any number of hardware and/or software applications that are executed to facilitate any of the operations.

In example embodiments, one or more I/O interfaces may facilitate communication between the electrical distribution system 100, the restoration system 300, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the electrical distribution system 100 and the restoration system 300. The one or more I/O interfaces 308 may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the electrical distribution system 100 and/or the restoration system 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (Owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the electrical distribution system 100 and the restoration system 300 with more or less of the components illustrated in FIGS. 1 and 3. Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
sectioning a de-energized region into two or more de-energized areas, wherein the sectioning comprises a consideration of a multiplicity of restoration techniques;
prioritizing restoration of the de-energized areas based at least in part on revenue, customer profiles, length of outage, available power source ratings, and switch ratings;
simulating opening or closing of one or more circuit switches associated with the two or more de-energized areas;
compiling a listing of simulated energized areas and simulated de-energized areas, based on the simulated opening or closing of the one or more circuit switches;
evaluating the listing of simulated energized areas and simulated de-energized areas, based at least in part on one or more configurable strategy modules; and
generating a restoration plan based at least in part on the evaluation.

2. The method of claim 1, further comprising determining a switching state associated with one or more switches.

3. The method of claim 1, wherein evaluating the listing of simulated energized areas comprises a sequential transformation of the listing by the one or more configurable strategy modules.

4. The method of claim 3, wherein the transformation comprises an operation having an input comprising a listing of simulated energized areas, a listing of simulated de-energized areas, and an optimization metric.

5. The method of claim 1, wherein the two or more de-energized areas comprise at least one isolation switch and zero or more tie switches.

6. The method of claim 5, wherein the zero or more tie switches are operable for connecting to an alternative power source.

7. The method of claim 1, wherein the simulated energized areas comprise at least one tie switch.

8. The method of claim 1, further comprising minimizing the simulated de-energized areas based at least in part on the one or more metrics.

9. The method of claim 1, wherein generating the restoration plan comprises zero or more energized areas each having one or more tie switches, and zero or more de-energized areas each one having zero or more tie switches.

10. A system comprising:
at least one memory for storing data and computer-executable instructions; and at least one processor configured to access the at least one memory and further configured to execute the computer-executable instructions to:
sectioning a de-energized region into two or more de-energized areas, wherein the section is based at least in part on a multiplicity of restoration techniques;
prioritize restoration of the de-energized areas based at least in part on revenue, customer profiles, length of outage, available power source ratings, and switch ratings;
simulate opening or closing of one or more circuit switches associated with the two or more de-energized areas;
compile a listing of simulated energized areas and simulated de-energized areas, based on the simulated opening or closing of the one or more circuit switches;
evaluate the listing of simulated energized areas and simulated de-energized areas, based at least in part on one or more configurable strategy modules; and
generate an electrical network restoration plan based at least m part on the prioritization.

11. The system of claim 10, wherein the at least one processor is further configured to determine a switching state associated with one or more switches.

12. The system of claim 10, wherein the at least one processor is further configured to evaluate the listing of simulated energized areas based at least in part on a sequential transformation of the listing by the one or more configurable strategy modules.

13. The system of claim 12, wherein the transformation comprises an operation having an input comprising a listing of simulated energized areas, a listing of simulated de-energized areas, and an optimization metric.

14. The system of claim 10, wherein the two or more de-energized areas comprise at least one isolation switch and zero or more tie switches.

15. The system of claim 14, wherein the zero or more tie switches are operable for connecting to an alternative power source.

16. The system of claim 10, wherein the simulated energized areas comprise at least one tie switch.

17. The system of claim 10, wherein the at least one processor is further configured to minimize the simulated de-energized areas based at least in part on the one or more metrics.

18. The system of claim 10, wherein the electrical network restoration plan comprises zero or more energized areas each having one or more tie switches, and zero or more de-energized areas each one having zero or more tie switches.

* * * * *